United States Patent [19]
Buescher et al.

[11] Patent Number: 5,992,604
[45] Date of Patent: Nov. 30, 1999

[54] SWITCHING ARRANGEMENT FOR RETURNING A PEOPLE-CONVEYING DEVICE TO A STATE OF READINESS

[75] Inventors: Hans-Werner Buescher, Unna; Christian Maletzki, Waltrop; Dirk Lange, Dortmund; Andreas Tautz, Waltrop, all of Germany

[73] Assignee: O & K Rolltreppen GmbH & Co. KG, Germany

[21] Appl. No.: 09/068,335

[22] PCT Filed: Nov. 6, 1996

[86] PCT No.: PCT/EP96/04839

§ 371 Date: Aug. 17, 1998

§ 102(e) Date: Aug. 17, 1998

[87] PCT Pub. No.: WO97/17278

PCT Pub. Date: May 15, 1997

[30]    Foreign Application Priority Data

Nov. 7, 1995 [DE] Germany .......................... 195 41 410

[51] Int. Cl.[6] ...................................................... B66B 25/00
[52] U.S. Cl. ........................................... 198/322; 198/323
[58] Field of Search ...................................... 198/322, 323

[56]               References Cited

U.S. PATENT DOCUMENTS 5,083,653   1/1992   Sakata et al. ............................ 198/322

FOREIGN PATENT DOCUMENTS

| 1 271 601 | 6/1968 | Germany . | |
|---|---|---|---|
| 29 11 658 | 9/1980 | Germany . | |
| 29 41 119 | 7/1981 | Germany . | |
| 2235791 | 3/1991 | United Kingdom | 198/323 |

OTHER PUBLICATIONS

Lift–Report 1994, Heft 4, S. 94.
TÜ 1994, Heft 7/8, S.330–331.

*Primary Examiner*—James R. Bidwell
*Attorney, Agent, or Firm*—Venable; George H. Spencer; Robert Kinberg

[57]              ABSTRACT

A switching arrangement for returning a people-conveying device to a state of readiness comprises a plurality of light barriers which are formed by emitters and receivers and whose signals are fed to at least one electronic evaluation device, which automatically returns the people-conveying device to a state in which it is ready for use after an emergency off switch has been activated. The individual emitters and receivers are combined to form a light barrier chain and are disposed approximately opposite one another at predetermined spacings. Emitters and receivers are provided alternately on each side of the people-conveying device. The wiring between individual emitters and receivers on each side of the people-conveying device is brought about by plug-in connections without any connections to the emitters and receivers on the opposite side.

17 Claims, 3 Drawing Sheets

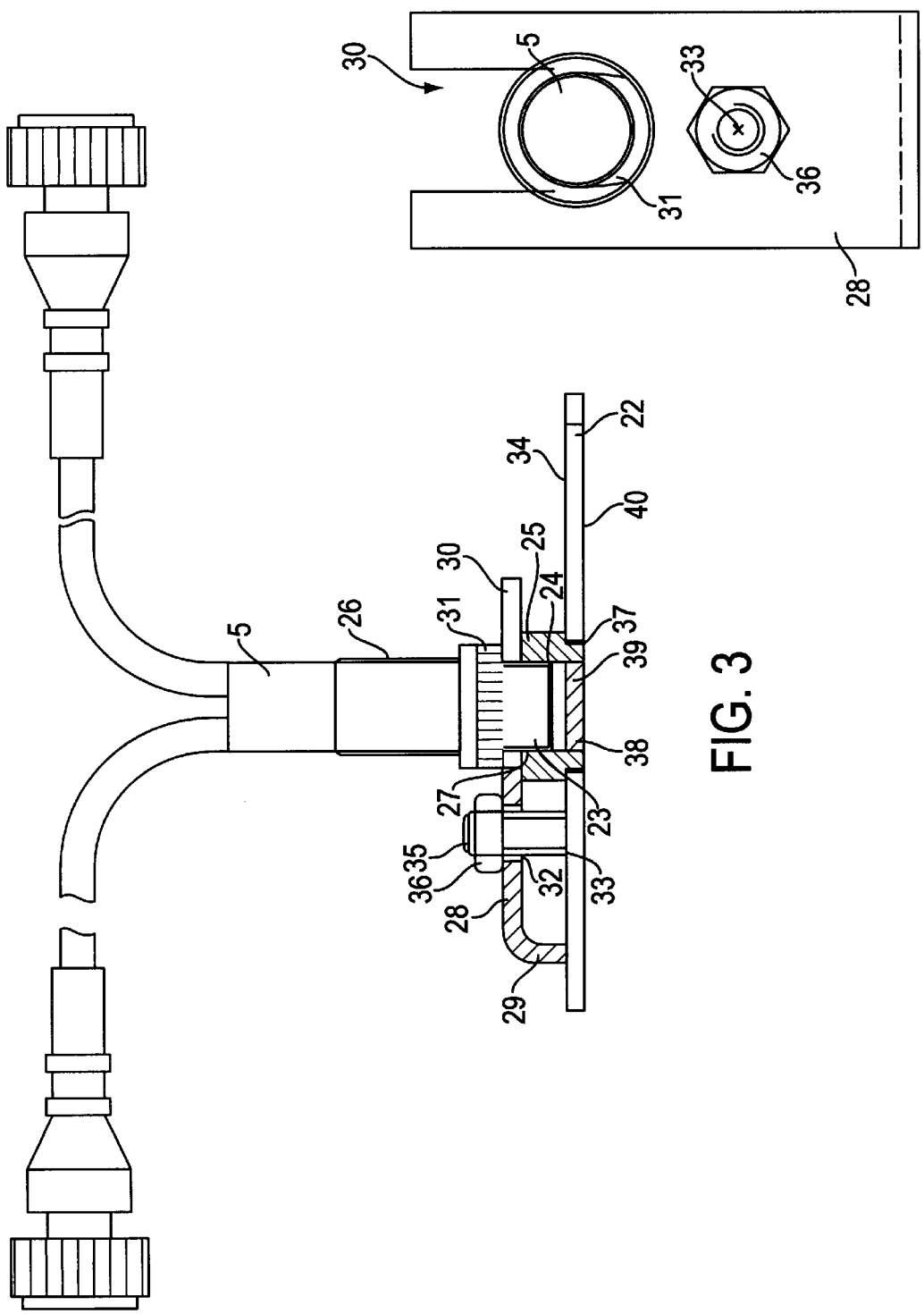

SWITCHING ARRANGEMENT FOR RETURNING A PEOPLE-CONVEYING DEVICE TO A STATE OF READINESS

The invention relates to a re-enabling device for passenger conveyors, more particularly for an escalator or travelator, comprising a plurality of light barriers consisting of emitters and receivers arranged in the vicinity of the step or pallet track in the skirting area, the signals of which are supplied to at least one electronic analyzer which automatically reinstates the ready ON condition of the passenger conveyor after the emergency OFF button has been activated.

FIELD OF THE INVENTION

Disclosed by DE-C 29 41 119 is a method for passenger safety in the travel area of passenger conveyors, more particularly escalators, involving system ON switching by monitoring with a light barrier arrangement and by correspondingly signalling an ON disable means in which light is guided in the light barrier arrangement from at least one emitter to at least one receiver by means of a reflector arrangement and checked for compliance with a predetermined minimum value. Each emitter is assigned a receiver in forming a monitoring section, whereby each monitoring section is monitored in conjunction with the reflector arrangement by "fanned" coverage. The disabled condition of the conveyor is cancelled by means of the ON disable means when the levels of the receiver signals on all monitoring sections exceed the minimum value and their differential quotient equals zero, i.e., the conveyor is only to be enabled when it is assured that no further passanger is present in the travel area of the conveyor. By this system as described above the travel area of the conveyor is monitored over its full area and thus practically totally, i.e., any passenger standing or lying on the conveyor is reliably sensed. In addition, passengers on the move are likewise detected so that the system cannot be re-enabled until nobody is still in the travel area. Thus despite re-enabling being automatic, any hazard to passengers is reliably excluded.

BACKGROUND OF THE INVENTION

Despite the functional safety of this system, it can nevertheless not be excluded that its functioning may be endangered by damage, especially in the case of vandalism, due to it necessarily requiring reflectors. In addition to this the expense in interwiring the light barriers is excessive.

OBJECTS AND SUMMARY OF THE INVENTION

The object of the subject matter of the invention is to further develop a re-enabling device for the passenger conveyors as set forth in the preamble of the first claims so that by configuration the monitoring device is as simple as possible. The expense involved in wiring, on the one hand, and thus also the signalling expense and, on the other, the mounting arrangement in the skirting area can be configured such that replacement of emitters and receivers is facilitated whilst being reliably protected from external effects.

This object is achieved in accordance with the invention by combining the individual emitters and receivers into a light barrier chain, arranging the emitters and receivers more or less opposite each other in given spacings, providing emitters and receivers or vice-versa alternating on each side of the passenger conveyor and producing the wiring of the individual emitters and receivers on each side of the passenger conveyor without connection to the receivers and emitters provided on the adjacent side by means of connectors.

Further aspects of the subject matter of the invention read from the sub-claims.

Whilst requiring merely two types of emitters and receivers in the light barrier chain a simple wiring arrangement is produced by coded connectors at the emitters and receivers, resulting in short wiring lengths between the components. Needing to connect the right-hand side to the left-hand side of the escalator or travelator is now just as superfluous as is the need to adjust the emitters and receivers.

As in the discussion of prior art, the reenabling device functions only after the emergency OFF button has been activated. Checking the light curtain is done on every emergency OFF action, the control being enabled in the predetermined time, for example, after 20 secs.

For each electronic analyzer roughly 100 emitters and receivers may be provided so that as a rule merely one electronic analyzer is sufficient for each escalator or travelator. The housing for the electronic analyzer is configured preferably modular.

The electronic analyzer comprises a means for automatically "seeing" the number of light barriers installed so that no adjustment is needed relative to the electronic analyzer, i.e., it can be replaced without necessitating any settings should it become defective.

The monitoring circuit is configured preferably redundant,, this as a rule involving two monitoring circuits configured separately by conventional means. From the light barrier chain two separate signals are analyzed by a microcontroller, the one signal being possibly a pulse signal used in detecting the location of faulty emitters or receivers, the other possibly being a voltage signal for enabling the redundant monitoring circuits, whereby open-circuit detection may also be provided.

Any additional components for analyzing faults are thus superfluous. Status displays may be implemented, for example, by colour LEDs in the electronic analyzer, alarms being indicated only in a fault situation.

Preferably the light barrier chain is powered not with 220 V but with a signal voltage of 24 V, for example. By a series arrangement of several analyzer means any number of monitored emitters and receivers may be provided so that even extra-long escalators or travelators can be correspondingly equipped with the re-enabling device of the invention. A 2-wire system (CAN bus) permits data transfer to an escalator diagnosis means.

In accordance with a further aspect of the invention the geometry of each emitter and receiver is configured the same, the only difference possibly being in a colour respect to assist in distinguishing an emitter from a receiver. Incorporated in the skirting area are recesses on a predetermined center-spacing, serving to accommodate the corresponding emitter/receiver, each of which is screwed into a corresponding guide element capped by a translucent cap in the skirting as an antivandalism means. This provides for a dust-tight arrangement of the optical components with a defined spacing between the emitter/receiver and the cap on the one hand, whilst, on the other, producing a smooth finish with the skirting. Securing the guide element relative to the skirting is preferably done by a downswept bracket provided slotted outside of the downswept portion to assist adjustment. The downswept length is the same as that of the portion of the guide element protruding inwards.

To form a unit the bracket is mounted with the slotted portion on the free face surface area of the guide element and positioned relative to the guide element by means of a cap nut provided above the guide element. This unit can then be secured to the skirting by a bolt connection or the Like, any corrections needing to be made being achieved by releasing the cap nut and shifting the bracket relative to the guide element.

In accordance with yet a further aspect of the invention the light barrier chain is operated with infrared light.

BRIEF DESCRIPTION OF THE DRAWINGS

The invention will now be detailed by way of an example embodiment as shown in the drawing in which:

FIG. 3 is a section view of the re-enabling device in the form of a receiver secured in an alternative arrangement to the skirting of a travelator, for example, and FIG. 4 is a plan view of the bracket as shown in FIG. 3.

DETAILED DESCRIPTION OF THE INVENTION

Figure 1:
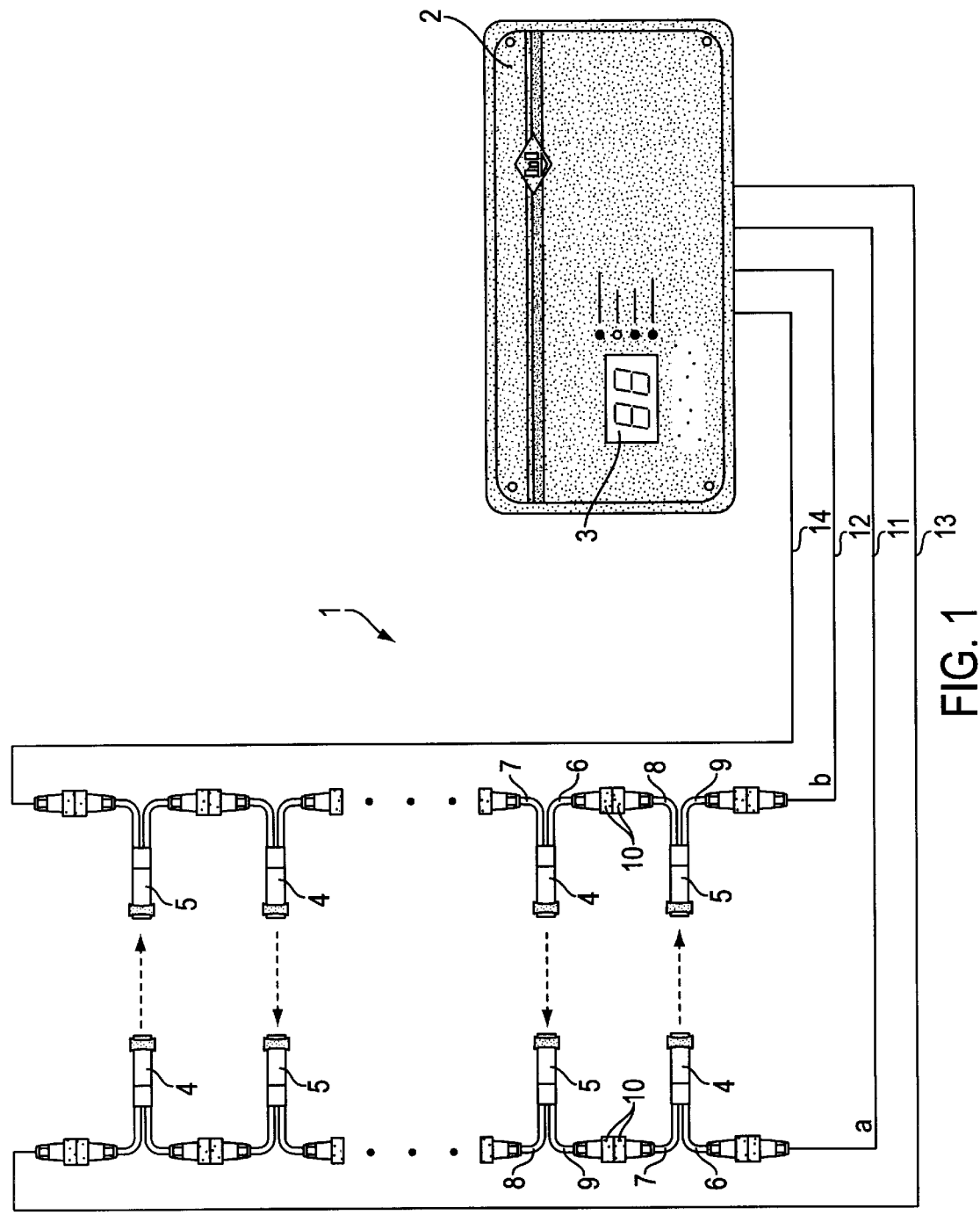
FIG. 1 is a system diagram of the re-enabling device in accordance with the invention.

Referring now to FIG. 1 there is illustrated a re-enabling device 1 in accordance with the invention intended for use in an escalator (not shown). Evident is an electronic analyzer 2 containing a display 3 for indicating alarms. The re-enabling device 1 comprises a light barrier chain formed by a plurality of emitters 4 and receivers 5 arranged alternatingly in the direction of travel of the escalator (not shown) such that a receiver 5 is provided more or less opposite each emitter 4. Each emitter 4 as well as each receiver 5 is provided with two cables 6,7 and 8,9 respectively which can be connected via corresponding connectors 10 to the associated cables 7,6 and 9,8 respectively of the other component in each case (receiver/emitter) in series, resulting in a light barrier chain on each side of the escalator. Wiring the left-hand (a) emitters/receivers to those of the right-hand side (b) is thus not necessary. The connectors 10 are configured preferably coded so that merely two types of the emitters 4 and receivers 5 are needed to produce the light barrier chain in each case. The individual emitters 4 and receivers 5 are interconnected by corresponding cables 11, 12 and return conductors 13, 14. This selected embodiment ensures short cable connections between emitters 4 and receivers 5 on each side a,b of the escalator, an adjustment of the emitters 4 and receivers 5 not being necessary as a rule. The re-enabling device 1 is activated after each emergency OFF action after a check has been made of the light curtain formed by the emitters 4 and receivers 5. Each electronic analyzer 2 can be assigned a plurality of emitters 4 and receivers 5 so that practically all lengths of the escalator can be monitored by a single electronic analyzer 2. Should, e.g., the number 100 be exceeded any number of monitored emitters 4 and receivers 5 can be provided by a series arrangement of several electronic analyzers 2.

Figure 2:
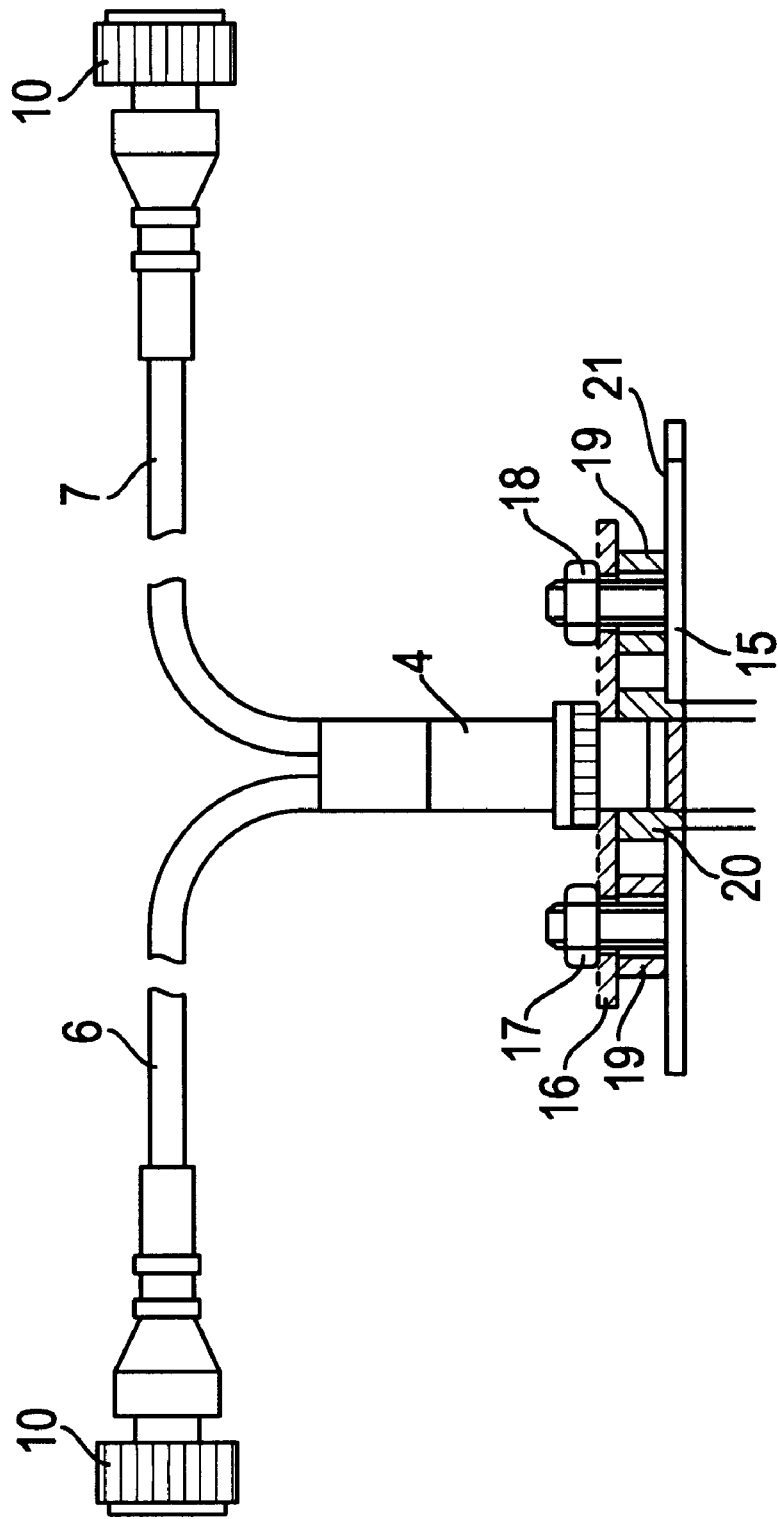
FIG. 2 is a section view of the re-enabling device in the form of an emitter secured to the skirting of an escalator, for example.

Referring now to FIG. 2 there is illustrated a section view indicating an emitter 4 provided protected in a skirting 15 (indicated merely suggested) of an escalator (not shown). As already explained relative to FIG. 1 the emitter 4 is equipped with 2 cable ends 6, 7 ending in the coded connectors 10 to which then either the cables 11, 12,13,14 (FIG. 1) leading to the electronic analyzer 2 or receivers 5 can be connected upstream or downstream. The emitter 4 is provided behind the skirting 15 where it is protected from damage. In this arrangement the fastening may be made via a bracket 16 which can be secured by means of screws 17, 18 and spacers 19 as well as guide elements 20 to the rear side 21 of the skirting 15.

Referring now to FIG. 3 there is illustrated a section view of the re-enabling device incorporating a receiver 5 having a bracket in a version modified relative to that of FIG. 2 as may be employed for example in the skirting 22 of a travelator (not shown). The free end 23 of the receiver 5 is incorporated with a guide element 25 featuring a tab 24 such that the male thread 26 of the receiver 5 is screwed into the female thread 27 of the guide element 25. Also provided is a bracket 28 comprising at one end a downswept portion 29 and at the other end a slotted portion 30. To form a unit the bracket 28 is mounted above the guide element 25 in the receiver 5 and secured in place by means of cap nut 31 likewise provided with a female thread opposite the guide element 25. The bracket 28 comprises between the end of the slot 30 an d the downswept portion 29 a through-hole 32 for passage of a fastener element 33 which in this example is a stud bolt connected to the rear side 34 of the skirting 22. The unit consisting of the receiver 5, guide element 25, bracket 28 as the cap nut 31 is then mounted on the stud bolt 33 provided with the thread 35, in the portion of the through-hole 32 and locked to the rear side 34 of the skirting 22 by means of a nut 36. In this arrangement the slot 30 is provided to compensate for tolerances of the recess 37 provided in the skirting 22 relative to the stud bolt 33, this compensation being achieved by the cap nut 31 being released and the bracket 28 shifted in the corresponding direction. The guide element 25 is provided in the region of the skirting 22 with a further tab 38 to which a cover plate 39, for example, of a translucent material is bonded. The guide element 25 is connected to the cover plate 39 such that a flat plane is formed which in the fitted condition of the receiver 5 likewise locates flush with the front side of the skirting 22.

FIG. 4 is a plan view of the bracket 28 including the slot 30 as well as the stud bolt 33 provided with the nut 36. Also evident is the receiver 5 as well as the cap nut 31.

What is claimed is:

1. A re-enabling device for passenger conveyors, which may comprise an escalator or travelator, comprising:

a plurality of light barriers consisting of emitters and receivers, said emitters and receivers arranged more or less opposite each other in given spacings, alternating on each side of said passenger conveyor and combined into a light barrier chain, arranged in the vicinity of a step or pallet track in a skirting area, and at least one electronic analyzer, receiving signals from said light barriers, and which automatically reinstates the ready ON condition of the passenger conveyor after the emergency OFF button has been activated, wherein the wiring of said individual emitters and receivers on each side of said passenger conveyor is produced, without connection to said receivers and said emitters provided on the opposite side, by means of connectors.

2. The device as set forth in claim 1, wherein each emitter or each receiver is provided with two cable ends including corresponding ones of said connectors for connecting to other corresponding elements.

3. The device as set forth in claim 1, wherein said connectors are configured coded.

4. The device as set forth in claim 1, wherein said emitters and receivers are provided on the basis of infrared light.

5. The device as set forth in claim 1, wherein said at least one electronic analyzer is a modular configured electronic analyzer.

6. The device as set forth in claim 1, further comprising:
   a redundant configured monitoring circuit for said emitters and receivers.

7. The device as set forth in claim 1, wherein a number of stalled emitters and receivers is automatically detected.

8. The device as set forth in claim 1, wherein said emitters and receivers are configured the same as regards their geometric configuration.

9. The device as set forth in claim 1, further comprising:
   a guide element insertable in a recess of a skirting, said emitters and receivers being retained within said guide element, and
   at least one bracket, said at least one bracket securing said emitters and receivers in place relative to said skirting of said escalator or travelator.

10. The device as set forth in claim 9, further comprising:
    a consisting of a translucent material, said component being disk-shaped, for closing off said guide element.

11. The device as set forth in claim 10, wherein said guide element including said component is insertable in the recess of said skirting such that a flush finish with said skirting is attainable.

12. The device as set forth in claim 9, wherein said emitters and said receivers are provided dust-tight within said corresponding guide element.

13. The device as set forth in claim 9, wherein said guide element comprises a female thread and each of said emitters as well as said receivers comprises a corresponding male thread, said emitters and said receivers being screwable into a corresponding guide element in maintaining a defined spacing from a mating component.

14. The device as set forth in claim 9, wherein said bracket is a piece of sheet metal comprising a through-hole for receiving a corresponding emitter or receiver and at least one through-hole for at least one fastener element.

15. The device as set forth in claim 14, wherein said bracket comprises a portion that is swept down in the region of one of its ends and is provided in the region of its other end with a slot extending in the direction of said swept down portion, said through-hole for receiving a fastener element being provided between the end of said slot and said swept down portion.

16. The device as set forth in claim 15, further comprising a cap nut, and wherein, for forming a unit, said slotted portion of said bracket is provided above said guide element and is securable in place by means of said cap nut, which features a female thread relative to said guide element such that said cap nut can be screwed onto said male thread provided on said corresponding emitter or receiver in the direction of said guide element.

17. The device as set forth in claim 15, wherein said device is secured to said skirting such that said guide element is positioned within said recess provided in said skirting, said swept down portion of said bracket being supported by a rear side of said skirting, and a fastener element, comprising a stud provided with a thread, passing through said through-hole for receiving a fastener element is cooperatively connectable to a nut.

* * * * *